(12) United States Patent
Oku et al.

(10) Patent No.: US 9,394,031 B2
(45) Date of Patent: Jul. 19, 2016

(54) BAR END ELECTRIC SHIFTER FOR BICYCLE

(75) Inventors: Kiwame Oku, Osaka (JP); Kazuhiro Fujii, Osaka (JP)

(73) Assignee: Shimano Inc., Osaka (JP)

( * ) Notice: Subject to any disclaimer, the term of this patent is extended or adjusted under 35 U.S.C. 154(b) by 1980 days.

(21) Appl. No.: 12/503,892

(22) Filed: Jul. 16, 2009

(65) Prior Publication Data

US 2011/0011197 A1    Jan. 20, 2011

(51) Int. Cl.

| | |
|---|---|
| *B62M 25/06* | (2006.01) |
| *B62M 25/08* | (2006.01) |
| *B62L 3/02* | (2006.01) |
| *B60T 7/08* | (2006.01) |
| *B60T 7/10* | (2006.01) |
| *B62K 23/02* | (2006.01) |
| *B62K 23/06* | (2006.01) |
| *B62M 25/04* | (2006.01) |

(52) U.S. Cl.
CPC ............. *B62M 25/08* (2013.01); *B60T 7/085* (2013.01); *B60T 7/102* (2013.01); *B62K 23/02* (2013.01); *B62K 23/06* (2013.01); *B62L 3/02* (2013.01); *B62M 25/04* (2013.01); *Y10T 74/2003* (2015.01)

(58) Field of Classification Search
CPC .......... B62K 23/06; B62L 3/02; B62M 25/04; B62M 25/08
USPC ................................ 74/502.2; 707/999.22
See application file for complete search history.

(56) References Cited

U.S. PATENT DOCUMENTS

| | | | |
|---|---|---|---|
| 4,462,267 A | 7/1984 | Shimano | |
| 6,015,036 A | 1/2000 | Fukuda | |
| 6,216,078 B1 | 4/2001 | Jinbo et al. | |
| 6,729,203 B2* | 5/2004 | Wesling et al. | ............. 74/502.2 |
| 6,991,081 B2 | 1/2006 | Uno et al. | |
| 7,184,872 B2* | 2/2007 | Guderzo | ........................ 701/51 |
| 7,350,436 B2 | 4/2008 | Fujii | |
| 7,540,216 B2* | 6/2009 | Campagnolo | .......... B62M 25/08 |
| | | | 74/489 |
| 7,565,848 B2 | 7/2009 | Fujii | |

(Continued)

FOREIGN PATENT DOCUMENTS

| | | |
|---|---|---|
| EP | 0 790 173 A1 | 8/1997 |
| EP | 0 891 009 A2 | 1/1999 |

(Continued)

OTHER PUBLICATIONS

European Search Report dated Apr. 22, 2010 of corresponding EP Application No. 10 15 1043.6.

(Continued)

*Primary Examiner* — William Kelleher
*Assistant Examiner* — Gregory Prather
(74) *Attorney, Agent, or Firm* — Global IP Counselors (57) ABSTRACT

A bar end electric shifter is provided for bicycle. The bar end electric shifter has a base member, a brake lever and a shift operating member. The base member includes a handlebar mounting portion and a brake lever mounting portion. The handlebar mounting portion is configured to be fixedly mounted to a free end of a handlebar. The brake lever is pivotally disposed on the brake lever mounting portion about a brake pivot axis. The brake lever includes an elongated brake operating portion extending from the brake pivot axis and a proximal portion adjacent to the brake pivot axis. The shift operating member is disposed on the proximal portion of the brake lever to move therewith.

20 Claims, 8 Drawing Sheets

(56) References Cited

U.S. PATENT DOCUMENTS

| | | | |
|---|---|---|---|
| 8,056,439 B2* | 11/2011 | Fukui et al. | 74/502.2 |
| 2001/0053724 A1 | 12/2001 | Campagnolo | |
| 2007/0175290 A1* | 8/2007 | Fujii | B62K 23/02 74/502.2 |
| 2007/0193387 A1 | 8/2007 | Nakano | |
| 2007/0193388 A1* | 8/2007 | Nakano | B62M 25/08 74/501.6 |
| 2008/0087131 A1 | 4/2008 | Tetsuka | |
| 2008/0121066 A1 | 5/2008 | Takebayashi et al. | |
| 2008/0168856 A1* | 7/2008 | Tetsuka | 74/502.2 |
| 2009/0031841 A1 | 2/2009 | Tetsuka | |
| 2009/0235772 A1 | 9/2009 | Naka et al. | |
| 2011/0011197 A1* | 1/2011 | Oku | B60T 7/085 74/473.12 |

FOREIGN PATENT DOCUMENTS

| | | |
|---|---|---|
| EP | 1245482 A2 | 10/2002 |
| EP | 1 808 367 A2 | 7/2007 |
| WO | WO-2009/011110 A1 | 1/2009 |

OTHER PUBLICATIONS

U.S. Appl. No. 12/359,430, filed Jan. 26, 2009, Tetsuka.
U.S. Appl. No. 12/468,381, filed May 19, 2009, Fujii et al.
European Offce Actionof corresponding EP Application No. 10 15 1043.6, dated Feb. 29, 2012.

* cited by examiner

BAR END ELECTRIC SHIFTER FOR BICYCLE

BACKGROUND OF THE INVENTION

1. Field of the Invention

This invention generally relates to a bicycle control device for performing a shifting operation. More specifically, the present invention relates to a bar end electric shifter with an integrated brake lever.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle, especially the bicycle control devices for shifting and braking.

In the case of a time trial bicycle, a bull horn handlebar is often used that curves forward away from the rider that allows the rider to ride in a tuck position. The bull horn handlebar is sometimes provided with a pair of aero bars or a single loop shaped aero bar. The aero bar attaches to the main bar near the stem and provides a position where the hands and fore-arms are close together, low and forward, providing a very aerodynamic (though less stable) position. Typically, each end of the bull horn handlebar is provided with a "handlebar end shifter" or "bar end shifter". These bar end shifters can include a brake lever in some instances.

In the past, bar end shifters were mechanically operated devices that were sometimes located near the brake levers of the bicycle. Thus, an operating force was typically applied by one of the rider's fingers to operate a shift control lever, which in turn transmitted the operating force to the drive component of a bicycle shifting mechanism by a cable that was fixed at one end to the control lever. More recently, electric switches have been used instead of mechanical control levers in order to operate the bicycle shifting mechanism. One example of an electrical shift control device is disclosed in U.S. Pat. No. 5,358,451. This patent discloses a plurality of electric switches may be provided at a plurality of handlebar locations in order to allow for quicker shifts and to enhance responsiveness. Another example of a bicycle electrical shift control device is disclosed in U.S. Patent Application Publication No. 2005/0211014.

SUMMARY OF THE INVENTION

One object of the present invention is to provide a bar end electric shifter that can be easily operated.

The foregoing object can basically be attained by providing a bar end electric shifter for bicycle. The bar end electric shifter comprises a base member, a brake lever and a shift operating member. The base member includes a handlebar mounting portion and a brake lever mounting portion. The handlebar mounting portion is configured to be fixedly mounted to a free end of a handlebar. The brake lever is pivotally disposed on the brake lever mounting portion about a brake pivot axis. The brake lever includes an elongated brake operating portion extending from the brake pivot axis and a proximal portion adjacent to the brake pivot axis. The shift operating member is disposed on the proximal portion of the brake lever to move therewith.

This and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
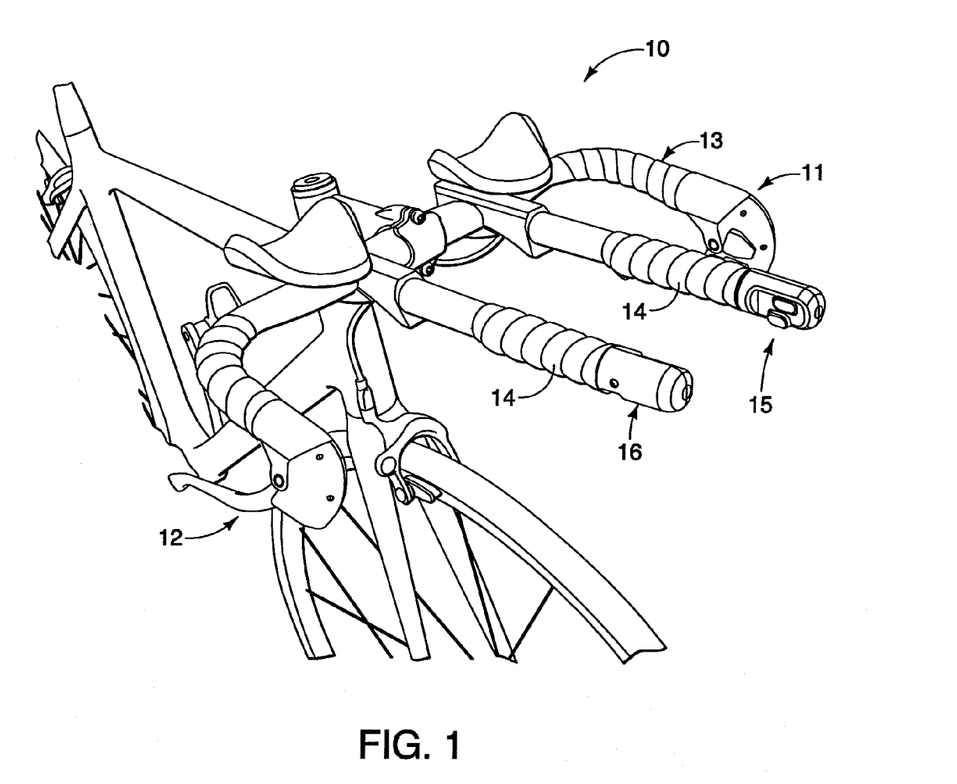
FIG. 1 is a partial front perspective view of a bicycle having a time trial or bull horn handlebar that is equipped with a pair of main bar end electric shifters (shift control devices) mounted to the free ends of the bull horn handlebar in accordance with a first embodiment.

Referring initially to FIG. 1, a time trial bicycle 10 is illustrated with a pair of main bar end electric shifters 11 and 12 in accordance with a first embodiment. The main bar end electric shifters 11 and 12 are mounted to the free ends of a time trial or bull horn handlebar 13. The main bar end electric shifters 11 and 12 constitute brake/shift control devices as discussed below. The bull horn handlebar 13 is also provided with a pair of attachment or aero bars 14. The aero bars 14 are provided with additional bar end electric shifters 15 and 16, respectively. The additional bar end electric shifters 15 and 16 are mounted to the free ends of the aero bars 14. The additional bar end electric shifters 15 and 16 constitute shift control devices. The main bar end electric shifters 11 and 12 and the additional bar end electric shifters 15 and 16 form parts of a brake and shift control system of the bicycle 10.

Basically, one of the main bar end electric shifters 11 and 12 and one of the additional bar end electric shifters 15 and 16 are operatively coupled to a rear derailleur (not shown), while the other ones of the main bar end electric shifters 11 and 12 and the additional bar end electric shifters 15 and 16 are operatively coupled to a front derailleur (not shown). For example, the bar end electric shifters 11 and 15 are operatively coupled to a rear derailleur (not shown), while the bar end electric shifters 12 and 16 are operatively coupled to a front derailleur (not shown).

Since derailleurs and braking devices as well as other conventional bicycle parts of the bicycle 10 are well known in the bicycle art, the derailleurs, the braking devices and the other bicycle parts of the bicycle 10 will not be discussed or illustrated in detail herein, except for the parts relating to the bar end electric shifters. Moreover, various conventional bicycle parts, which are not illustrated and/or discussed in detail herein, can also be used in conjunction with the bicycle 10.

Referring now to FIGS. 2 to 6, since the main bar end electric shifters 11 and 12 are essentially identical in construction and operation, except that they are mirror images of each other, only the main bar end electric shifter 12 will be discussed and illustrated in detail herein. The main bar end electric shifter 12 mainly includes a base member 24, a brake lever 26 and an electrical shift control switch assembly 28.

Preferably, the base member 24 includes a handlebar mounting portion 30 and a brake lever mounting portion 32. The handlebar mounting portion 30 is formed at a proximal end of the base member 24 with respect to the bull horn handlebar 13. The brake lever mounting portion 32 is formed at a distal end of the base member 24 with respect to the bull horn handlebar 13. In the illustrated embodiment, the handlebar mounting portion 30 and the brake lever mounting portion 32 are primarily formed of a hard rigid plastic material. Basically, the base member 24 pivotally supports the brake lever 26, which in turn supports the electrical shift control switch assembly 28. The brake lever 26 is connected to one end of a brake control wire 34 to mechanically operate a braking device. The brake control wire 34 runs along the inside of the bull horn handlebar 13, as explained below. The electrical shift control switch assembly 28 is electrically coupled to an electric derailleur or some other type of gear shifting device by an electrical cord 36. The electrical cord 36 runs along the outside of the bull horn handlebar 13, and is preferably covered by handlebar tape as seen in FIG. 1.

Figure 2:
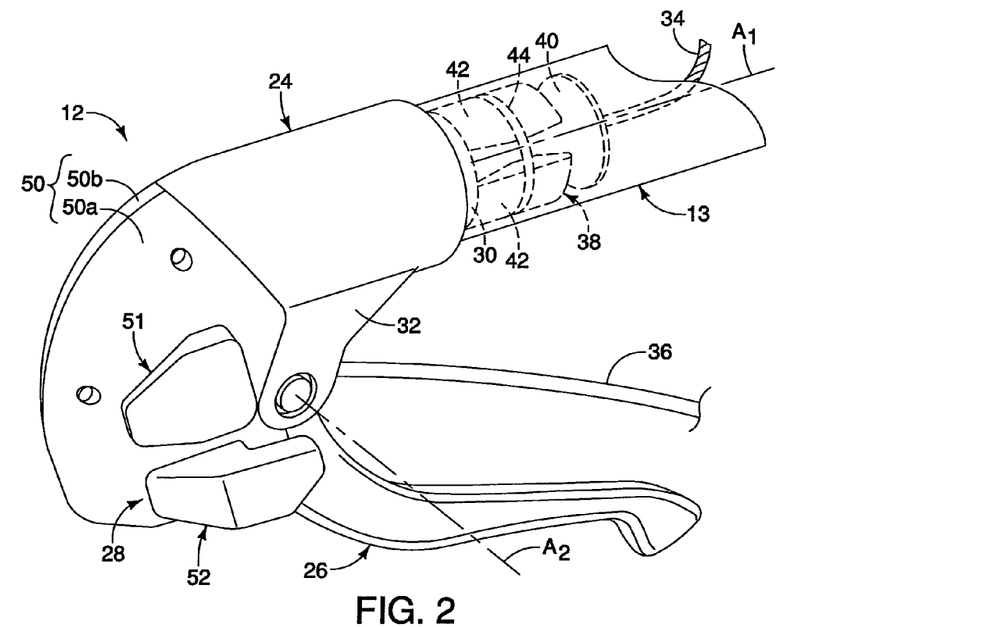
FIG. 2 is an enlarged inside perspective view of the right bar end electric shifter attached to the right free end of the bull horn handlebar illustrated in FIG. 1.
Figure 4:
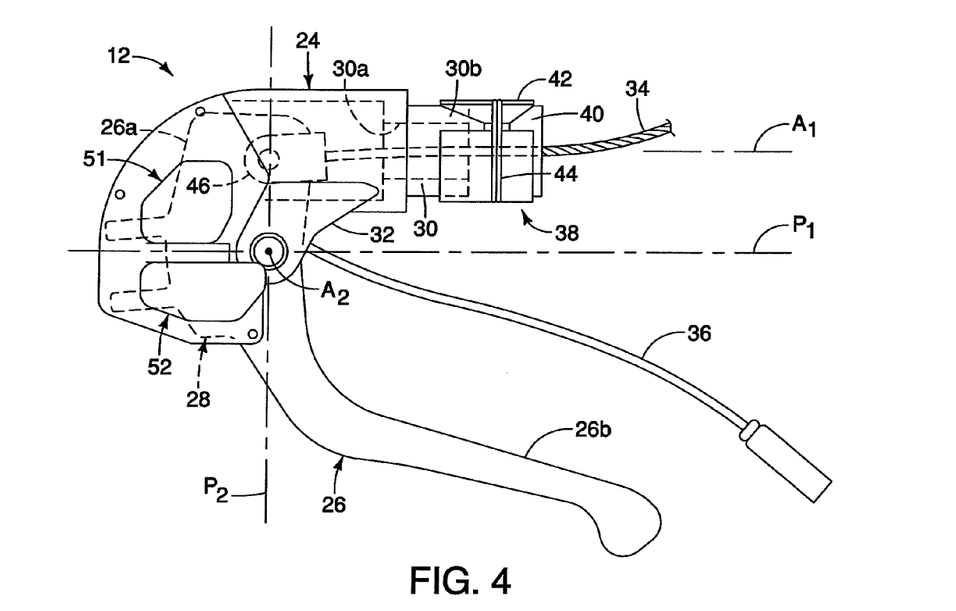
FIG. 4 is an inside elevational view of the bar end electric shifter illustrated in FIGS. 1 to 3.

As seen in FIG. 2, the handlebar mounting portion 30 is configured to be fixedly mounted to a right free end of the bull horn handlebar 13 such that the electrical shift control switch assembly 28 is operable on the inwardly facing side of the base member 24, and the brake lever 26 extends downwardly and generally parallel to a main center longitudinal axis $A_1$ of the handlebar 13. In particular, the handlebar mounting portion 30 is a bar end mount that is dimensioned to fit inside the free end of the bull horn handlebar 13. As seen in FIG. 4, the bar end mount that forms the handlebar mounting portion 30 has a brake control wire receiving passageway 30a extending in a longitudinal direction of the bar end mount to guide the brake control wire 34 into the free end of the bull horn handlebar 13 of the bicycle 10. Preferably, the brake control wire receiving passageway 30a is a threaded passageway, which is formed by a metallic insert embedded in the handlebar mounting portion 30.

Figure 3:
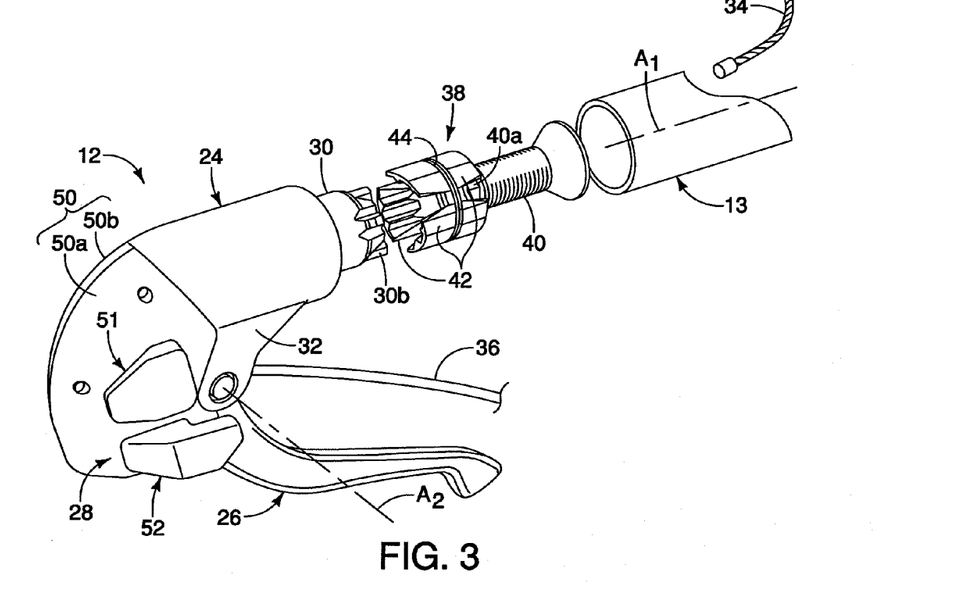
FIG. 3 is an inside perspective view, similar to FIG. 2, of the bar end electric shifter, but prior to attachment to the right free end of the bull horn handlebar illustrated in FIGS. 1 and 2.

As seen in FIGS. 2 to 4, an attachment structure 38 is used to mount the handlebar mounting portion 30. The attachment structure 38 basically has a fixing bolt 40 and three expansion members 42, which are coupled together by an expandable ring member 44. The fixing bolt 40 has a brake control wire receiving passageway 40a as seen in FIG. 3. Preferably, at least part of the brake control wire receiving passageway 40a has a hexagonal cross section for receiving a hex tool such as an Allen wrench.

Basically, the attachment structure 38 is an expandable unit that is slidable within the free end of the handlebar 13 together with the bar end mount that forms the handlebar mounting portion 30 when in a first unexpanded configuration. When the fixing bolt 40 is threaded into the brake control wire receiving passageway 30a, the expansion members 42 are forced into engagement with an outer tapered surface 30b of the handlebar mounting portion 30 such that the fixing bolt 40 and the handlebar mounting portion 30 push the expansion members 42 radially outward to a second expanded configuration. When in a second expanded configuration, the attachment structure 38 retains the handlebar mounting portion 30 in a non-slidable state within the free end of the handlebar 13.

The outer tapered surface 30b of the handlebar mounting portion 30 is sized to be received inside the free end of the handlebar 13. The outer tapered surface 30b is preferably provided with wedges that partially define a frustoconical shape. The expansion members 42 are preferably circumferentially arranged about a longitudinal axis of the fixing bolt 40 to move radially outwardly upon axially moving the fixing bolt 40 (i.e., screwing the fixing bolt 40 into the threaded bore of the brake control wire receiving passageway 30a). Each of the expansion members 42 includes a pair of opposed, arc-shaped inclined surfaces, and an outer groove. The expandable ring member 44 is preferably a coiled wire ring that is constructed to form a resiliently expandable ring. The expandable ring member 44 extends around the expansion members 42 to retain the expansion members 42 together with the fixing bolt 40. The arc shaped inclined surfaces of the expansion members 42 form a substantially frustoconically shaped wedge. The outer tapered surface 30b of the handlebar mounting portion 30 contacts the inclined surfaces of the expansion members 42. Thus, when the fixing bolt 40 is rotated to move towards the outer tapered surface 30b of the handlebar mounting portion 30, the inclined surfaces cooperate with inclined surfaces of the fixing bolt and the outer tapered surface 30b, respectively, to move the expansion members 42 and the expandable ring member 44 (i.e., the expansion structure) radially outward.

Figure 5:
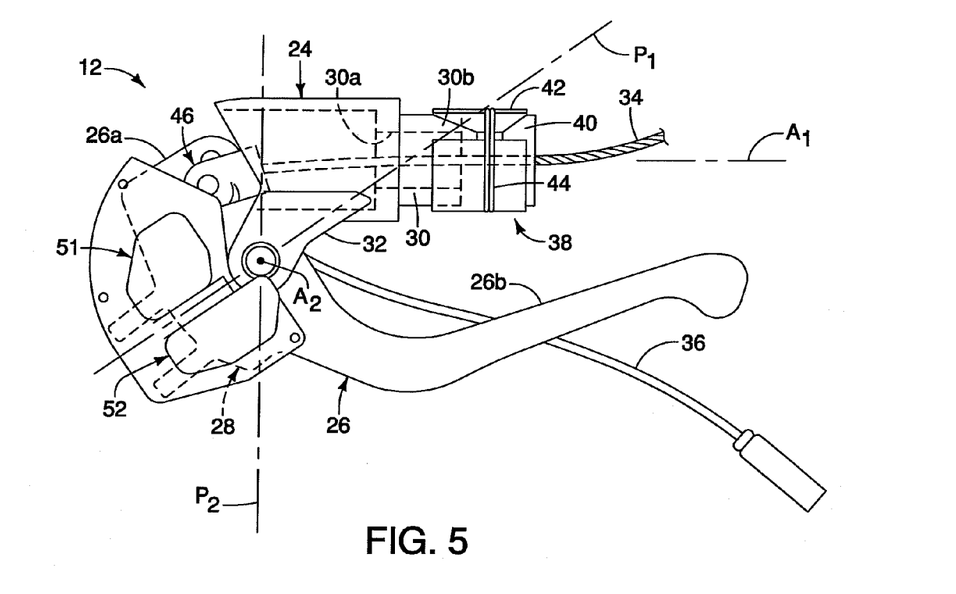
FIG. 5 is an inside elevational view, similar to FIG. 4, of the bar end electric shifter, but with the brake lever moved to the braking position.
Figure 6:
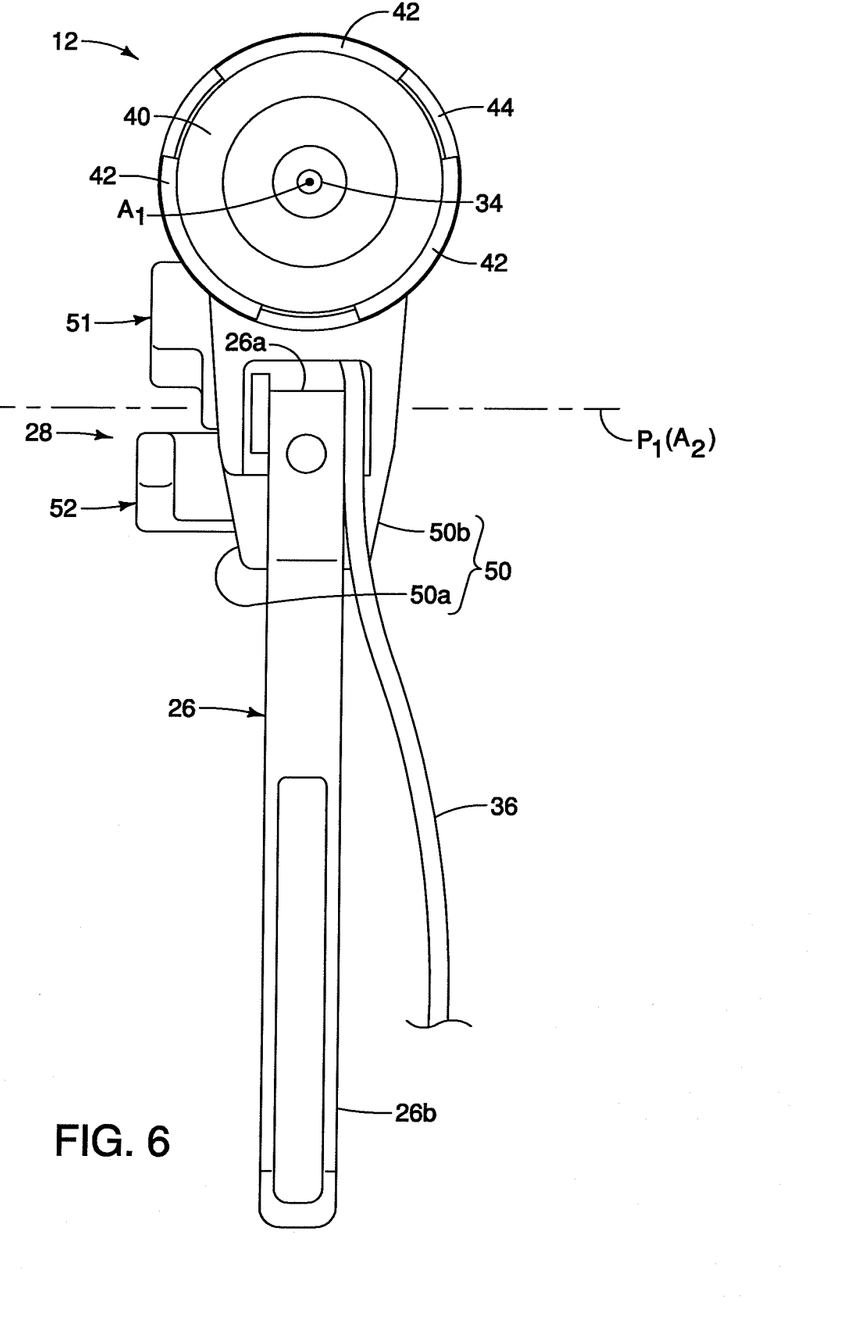
FIG. 6 is a rear end elevational view of the bar end electric shifter illustrated in FIGS. 1 to 5.
Figure 7:
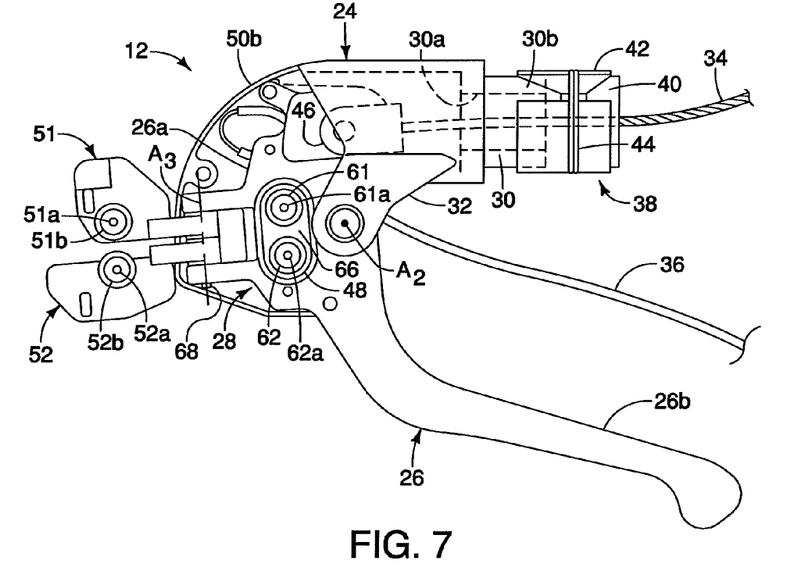
FIG. 7 is an inside elevational view of the bar end electric shifter illustrated in FIGS. 1 to 6, but with the inside cover of the switch housing removed.
Figure 8:
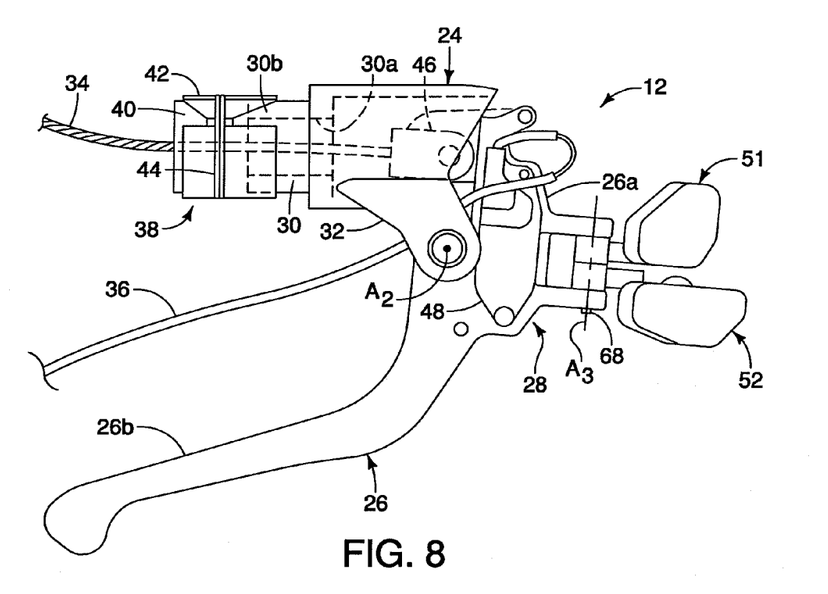
FIG. 8 is an outside elevational view of the bar end electric shifter illustrated in FIGS. 1 to 7, but with the switch housing removed.
Figure 9:
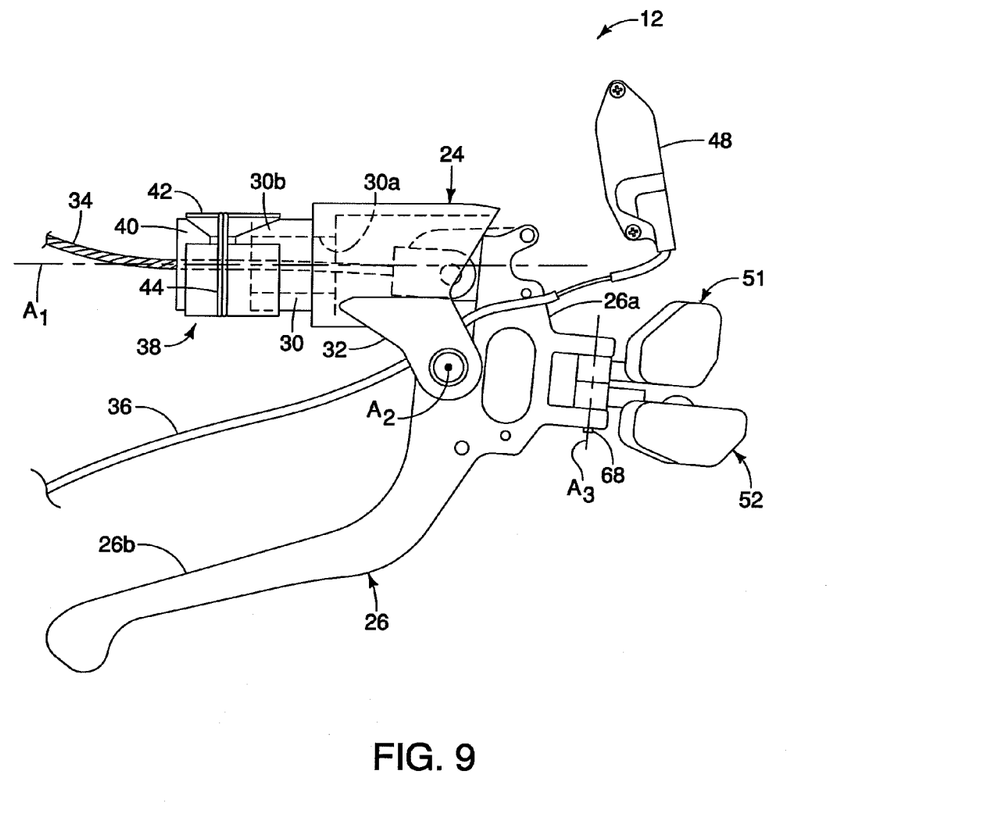
FIG. 9 is an outside elevational view of the bar end electric shifter illustrated in FIGS. 1 to 8, but with the switch and the switch housing removed.
Figure 10:
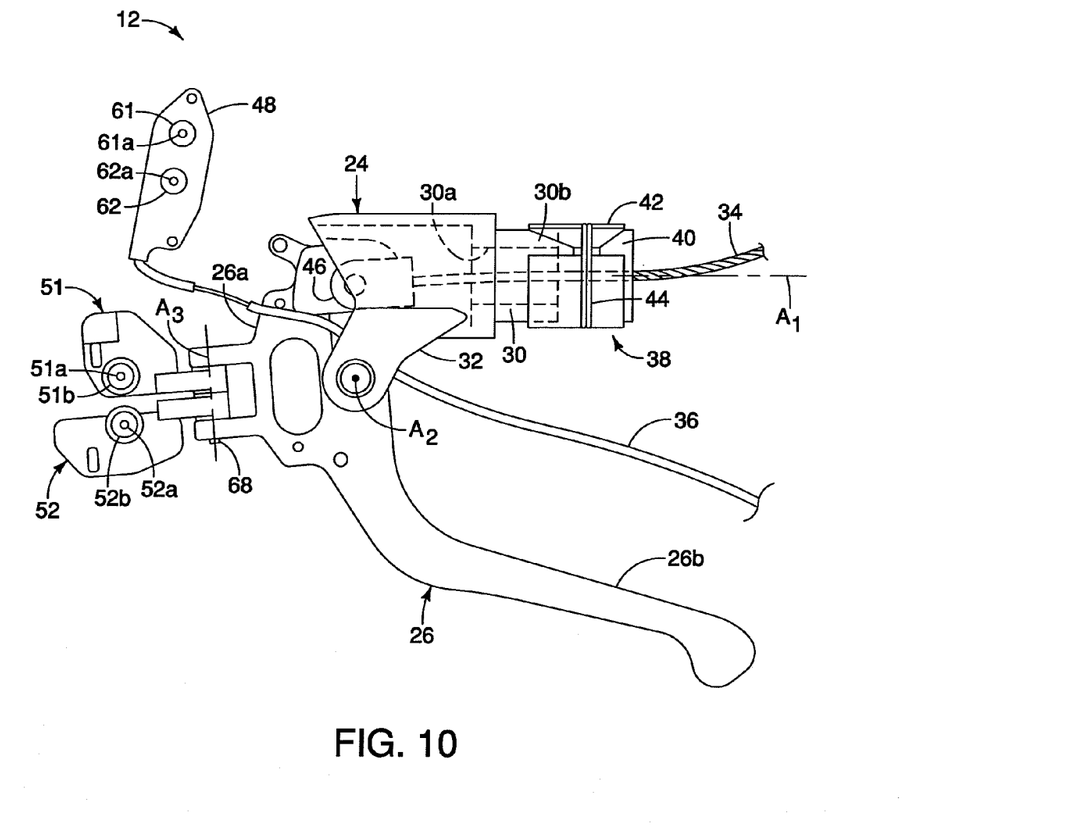
FIG. 10 is an inside elevational view of the bar end electric shifter illustrated in FIGS. 1 to 9, but with the switch and the switch housing removed.
Figure 11:
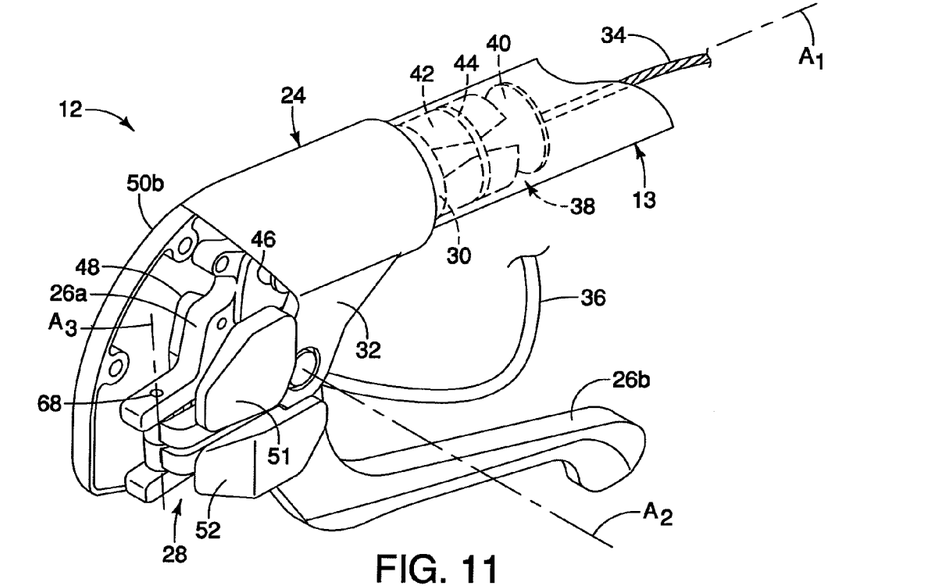
FIG. 11 is an inside perspective view of the bar end electric shifter illustrated in FIGS. 1 to 10 with the inside cover exploded outwardly to reveal the internal shifting components.

As can best be seen from FIGS. 4 and 5, the brake lever 26 is pivotally disposed on the brake lever mounting portion 32 about a brake pivot axis $A_2$. The brake lever 26 includes a proximal portion 26a surrounding the brake pivot axis $A_2$ and an elongated brake operating portion 26b extending from the proximal portion 26a surrounding the brake pivot axis $A_2$ to a free end. The proximal portion 26a has a U shaped brake wire attachment element 46 pivotally mounted thereto. One end the brake control wire 34 is attached to the attachment element 46, while the other end of the brake control wire 34 is attached to a brake device (not shown).

As seen in FIGS. 7, 8, 11 and 12, the proximal portion 26a also supports the electrical shift control switch assembly 28 such that the electrical shift control switch assembly 28 moves with the brake lever 26 as the brake lever 26 is pivoted from a rest position (FIG. 4) to a braking position (FIG. 5). Thus, the relationship between the brake lever 26 and the electrical shift control switch assembly 28 remains unchanged during a braking operation.

Figure 12:
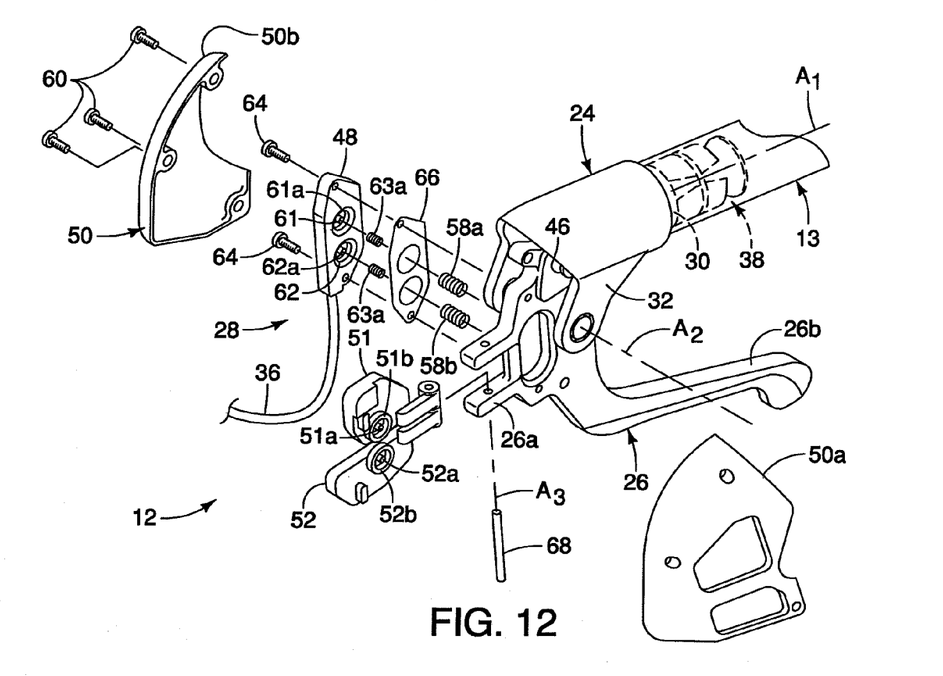
FIG. 12 is an inside perspective view of the bar end electric shifter illustrated in FIGS. 1 to 8 with the internal shifting components exploded outwardly from the electrical switch housing.

As seen in FIGS. 7 to 12, the electrical shift control switch assembly 28 basically includes an electrical switch 48, an electrical switch housing 50, a first electrical shift operating member 51 and a second electrical shift operating member 52. As seen in FIG. 12, the electrical shift control switch assembly 28 is electrically coupled to the electrical cord 36 which has two or more electrical conductors. The precise structure of the electrical shift control switch assembly 28 is not important to the understanding of the illustrated embodiment and can be construction in a variety of ways to carry out the shifting operation.

The electric switch 48 is disposed on the proximal portion 26a of the brake lever 26. In particular, the electrical switch 48 is fixedly mounted to the proximal portion 26a of the brake lever 26 by a pair of screws 54. The shift operating members 51 and 52 are disposed on the proximal portion 26a of the brake lever 26 so as to move with the proximal portion 26a of the brake lever 26. The electrical shift operating members 51 and 52 are pivotally mounted to the proximal portion 26a of the brake lever 26 by a single pivot pin 68, and configured to activate the electric switch 48 by movement of the shift operating members 51 and 52 with respect to the brake lever 26.

The electrical switch housing 50 houses the electrical switch 48 and holds the electrical shift operating members 51 and 52 in their neutral or rest positions against the biasing forces of return springs 58a and 58b. The shift operating members 51 and 52 are preferably located on a laterally inner side of the electrical switch housing 50 with respect to a vertical center plane of the bicycle 10 when the bar end electric shifter 12 is attached to the bull horn handlebar 13 of the bicycle 10. Thus, in this embodiment, the electrical shift operating members 51 and 52 are located on the lateral side of the electrical switch housing 50 that faces towards the vertical center plane of the bicycle 10.

As seen in FIG. 4, in this embodiment, the second electrical shift operating member 52 protrudes out from the inner cover part 50a by a greater amount than the first electrical shift operating member 51. Also in this embodiment, the first electrical shift operating member 51 is disposed above the second electrical shift operating member 52, with the second electrical shift operating member 52 being longer in dimension than the first electrical shift operating member 51 in a direction parallel to the main center longitudinal axis $A_1$ of the free end of the bull horn handlebar 13. Also in this embodiment, the second electrical shift operating member 52 is shorter in dimension than the first electrical shift operating member 51 in a direction perpendicular to the main center longitudinal axis $A_1$ of the free end of the bull horn handlebar 13. The first electrical shift operating member 51 is disposed primarily above plane $P_1$ containing the brake pivot axis $A_2$ and extending parallel to the main center longitudinal axis $A_1$ of the free end of the bull horn handlebar 13 when the bar end electric shifter 12 is attached to the bull horn handlebar 13 of the bicycle 10. The second electrical shift operating member 52 is disposed primarily below the plane $P_1$ when the bar end electric shifter 12 is attached to the bull horn handlebar 13 of the bicycle 10.

The electrical shift operating members 51 and 52 are disposed on an opposite side of a plane $P_2$ from the handlebar mounting portion 30. The plane $P_2$ contains the brake pivot axis $A_2$ and extends perpendicular to the center longitudinal axis $A_1$ of the free end of the bull horn handlebar 13 when the bar end electric shifter 12 is attached to the bull horn handlebar 13 of the bicycle 10. Thus, the handlebar mounting portion 30 is disposed on a first side of the plane $P_2$ while the electrical shift operating members 51 and 52 are disposed on second side of the plane $P_2$.

The electrical switch housing 50 has an inner cover part 50a and an outer cover part 50b that form a hollow interior for housing the electrical switch 48. Thus, the brake lever 26 effectively includes the electrical switch housing 50 that enclosing the electrical switch 48. The inner cover part 50a forms a first lateral side of the electrical switch housing 50 that faces towards a vertical center plane of the bicycle 10 when the handlebar mounting portion 30 is mounted to the free end of the handlebar 13. The outer cover part 50b forms a second lateral side of the electrical switch housing 50 that is opposite to the inner cover part 50a and faces away from the vertical center plane of the bicycle 10. In the illustrated embodiment, the center axis $A_1$ of the free end of the handlebar 13 extends longitudinally through an upper portion of the electrical switch housing 50 between the first and second lateral sides when the handlebar mounting portion 30 is mounted to the free end of the handlebar 13.

In the illustrated embodiment, the inner and outer cover parts 50a and 50b are fastened to the proximal portion 26a of the brake lever 26 by three fasteners 60 such as screws in a releasable and reinstallable manner. In the illustrated embodiment, the inner cover part 50a is provided with three threaded holes, while the outer cover part 50b is provided with two unthreaded holes. The proximal portion 26a of the brake lever 26 has two holes such that two of the three fasteners 60 pass through the holes in the proximal portion 26a of the brake lever 26 when the inner and outer cover parts 50a and 50b are fastened to the proximal portion 26a of the brake lever 26. When the fasteners 60 are unthreaded from holes in the inner cover part 50a, the inner and outer cover parts 50a and 50b can be detached from the brake lever 26. The electrical switch 48 can then be removed from the brake lever 26 without detaching the handlebar mounting portion 30 from the handlebar 13.

The electrical switch 48 and the electrical shift operating members 51 and 52 cooperate together to form a pair of push buttons type switches. The electrical shift operating members 51 and 52 protrude outwardly from the inner cover part 50a of the electrical switch housing 50. Preferably, the electrical shift operating members 51 and 52 pivot about an operating axis $A_3$. As mentioned above, the biasing forces of the return springs 58a and 58b hold the electrical shift operating members 51 and 52, respectively, in their neutral or rest positions. Thus, the electrical shift operating members 51 and 52 are preferably push buttons in which each are movable relative to the base member 24 from their neutral or rest position to an actuating position against the biasing forces of the return springs 58a and 58b, respectively.

Accordingly, the electrical shift operating members 51 and 52 can be utilized for both downshifting and upshifting one of the derailleurs. The first electrical shift operating member 51 is a downshift button that depressed to downshift towards a lower gear, while the second electrical shift operating member 52 is an upshift button that depressed to upshift towards a higher gear. Of course, it will be apparent to those skilled in the art from this disclosure that the upshifting and downshifting operations of the electrical shift operating members 51 and 52 could be reversed if needed and/or desired, depending on how the electrical cord 36 is connected.

In the illustrated embodiment, as seen in FIG. 12, the electrical switch 48 includes first and second actuating buttons 61 and 62 are normally open pushbutton switches. The electrical switch 48 is electrically coupled to the electrical cord 36 such that a first electrical shift signal is output in response to the first electrical shift operating member 51 being depressed, which closes a first internal circuit of the electrical switch 48, and such that a second electrical shift signal is output in response to the second electrical shift operating member 52 being depressed, which closes a second internal circuit of the electrical switch 48.

Each of the first and second actuating buttons 61 and 62 has an internal spring mechanism (not shown) that returns the actuating buttons 61 and 62 to its "out" or "unpressed" position once the shift operating member 51 or 52 is released. Preferably, the first actuating button 61 has a projection 61a that is operated (depressed) by a contact actuating spring 63a in response to the first electrical shift operating member 51 being depressed. More specifically, one (first) end of the contact actuating spring 63a is frictionally engaged with the projection 61a, while the other (second) end of the first contact actuating spring 63a is slidably engaged with a projection 51a of the first electrical shift operating member 51. The first end of the contact actuating spring 63a engages the projection 61a to hold the contact actuating spring 63a in a recess on the outbound side of the electrical switch 48. The second end of the contact actuating spring 63a engages the projection 51a of the first electrical shift operating member 51 to hold the contact actuating spring 63a within a recess defined by a circular wall 51b of the first electrical shift operating member 51. When the first electrical shift operating member 51 is depressed against the biasing force of the return spring 58a, the contact actuating spring 63a will initially slide on the engage the projection 51a of the first electrical shift operating member 51 and then the contact actuating spring 63a will be slightly compressed before depressing the first actuating button 61 to send a shift signal.

Similarly, the second actuating button 62 has a projection 62a that is operated (depressed) by a contact actuating spring 63b in response to the second electrical shift operating member 52. More specifically, one (first) end of the second contact actuating spring 63b is frictionally engaged with the projection 62a, while the other (second) end of the second contact actuating spring 63b is slidably engaged with a projection 52a of the second electrical shift operating member 52. The first end of the contact actuating spring 63b engages the projection 62a to hold the contact actuating spring 63b in a recess on the outbound side of the electrical switch 48. The second end of the contact actuating spring 63b engages the projection 52a of the second electrical shift operating member 52 to hold the contact actuating spring 63b within a recess defined by a circular wall 52b of the second electrical shift operating member 52. When the second electrical shift operating member 52 is depressed against the biasing force of the return spring 58b, the contact actuating spring 63b will initially slide on the engage the projection 52a of the second electrical shift operating member 52 and then the contact actuating spring 63b will be slightly compressed before depressing the second actuating button 62 to send a shift signal. The electrical switch 48 is a conventional type of switch that is well known and thus, the details of the electrical switch 48 will not be illustrated and/or described in greater detail herein.

In the illustrated embodiment, as seen in FIG. 12, the electrical switch 48 is mounted to the outbound side of the proximal portion 26a of the brake lever 26 by three fasteners 64 such as screws in a releasable and reinstallable manner. The electrical switch 48 overlies an opening in the proximal portion 26a of the brake lever 26 such that the actuating buttons 61 and 62 are exposed through the opening in the proximal portion 26a of the brake lever 26. A gasket 66 is disposed between the inbound side of the electrical switch 48 and the outbound side of the proximal portion 26a of the brake lever 26.

Referring to back to FIG. 1, since the bar end electric shifters 15 and 16 are essentially identical in construction and operation, except that they are mirror images of each other. Moreover, the additional bar end electric shifters 15 and 16 are similar in construction and operation to the main bar end electric shifter 12, discussed above, except that the braking aspect of the main bar end electric shifter 12 has been eliminated from the bar end electric shifters 15 and 16.

General Interpretation of Terms

As used herein to describe the electrical bicycle shift control device, the following directional terms "forward", "rearward", "above", "downward", "vertical", "horizontal", "below", "outbound", "inbound" and "transverse" as well as any other similar directional terms refer to those directions of a bicycle equipped with the electrical bicycle shift control device. Accordingly, these terms, as utilized to describe the shifter should be interpreted relative to a bicycle equipped with the electrical bicycle shift control device. Also in understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, while the above structures are especially useful as bar end shifters for aero bars and/or bull horn handlebars, it will be apparent to those skilled in the art from this disclosure that the above structures can be adapted to other types of shifters that are mounted to the handlebar at an area other than the bar end. Moreover, for example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A bar end electric shifter for a bicycle comprising:
a base member including a handlebar mounting portion and a brake lever mounting portion, the handlebar mounting portion being configured to be fixedly mounted to a free end of a handlebar;

a brake lever pivotally disposed on the brake lever mounting portion about a brake pivot axis, the brake lever including an elongated brake operating portion extending from the brake pivot axis to a free end of the brake lever, the elongated brake operating portion having a midpoint disposed halfway between the free end of the brake lever and a proximal portion adjacent to the brake pivot axis; and a shift operating member disposed on the proximal portion of the brake lever at a location adjacent to the brake pivot axis with respect to the midpoint of the brake lever, the shift operating member being configured to move therewith the brake lever.

2. The bar end electric shifter according to claim 1, wherein
the handlebar mounting portion is disposed on a first side of a plane containing the brake pivot axis and extending perpendicular to a center longitudinal axis of the free end of the handlebar when the bar end electric shifter is attached to the handlebar of the bicycle, and
the shift operating member is at least partially disposed on a second side of the plane containing the brake pivot axis and extending perpendicular to the center longitudinal axis of the free end of the handlebar when the bar end electric shifter is attached to the handlebar of the bicycle.

3. The bar end electric shifter according to claim 1, further comprising
an electric switch configured to be activated by movement of the shift operating member with respect to the brake lever.

4. The bar end electric shifter according to claim 1, wherein
the shift operating member is at least partially disposed above a plane containing the brake pivot axis and extending parallel to a center longitudinal axis of the free end of the handlebar when the bar end electric shifter is attached to the handlebar of the bicycle.

5. The bar end electric shifter according to claim 1, further comprising
an additional shift operating member disposed on the brake lever.

6. The bar end electric shifter according to claim 5, wherein
the shift operating member is disposed primarily above a plane containing the brake pivot axis and extending parallel to a center longitudinal axis of the free end of the handlebar when the bar end electric shifter is attached to the handlebar of the bicycle, and
the additional shift operating member is disposed primarily below the plane containing the brake pivot axis and extending parallel to the center longitudinal axis of the free end of the handlebar when the bar end electric shifter is attached to the handlebar of the bicycle.

7. The bar end electric shifter according to claim 5, wherein
the shift operating member and the additional shift operating member are push button operating members.

8. The bar end electric shifter according to claim 7, wherein
the shift operating member and the additional shift operating member are operatively arranged to pivot on a single shift axis when operated respectively, the shift axis extending perpendicular to a center longitudinal axis of the free end of the handlebar.

9. The bar end electric shifter according to claim 1, wherein
the shift operating member is located on a laterally inner side of the brake lever with respect to a center plane of a bicycle when the bar end electric shifter is attached to the handlebar of the bicycle.

10. The bar end electric shifter according to claim 1, wherein
the brake lever has a housing enclosing the electric switch.

11. The bar end electric shifter according to claim 1, wherein
the handlebar mounting portion is a bar end mount that is dimensioned to fit inside the free end of the handlebar, with the bar end mount having a brake control wire receiving passageway extending in a longitudinal direction of the bar end mount to guide a brake control wire into the free end of the handlebar.

12. The bar end electric shifter according to claim 1, wherein
the shift operating member is a push button operating member.

13. The bar end electric shifter according to claim 12, wherein
the shift operating member is operatively arranged to pivot on a shift axis when operated, the shift axis extending perpendicular to a center longitudinal axis of the free end of the handlebar.

14. The bar end electric shifter according to claim 1, wherein
the shift operating member is operatively arranged to move relative to the brake lever while the brake lever remains at a rest position.

15. A bar end electric shifter for a bicycle comprising:
a base member including a handlebar mounting portion and a brake lever mounting portion, the handlebar mounting portion being a bar end mount that is dimensioned to fit inside a free end of a handlebar;
a brake lever pivotally disposed on the brake lever mounting portion about a brake pivot axis, the brake lever including an elongated brake operating portion extending from the brake pivot axis and a proximal portion adjacent to the brake pivot axis; and
a shift operating member disposed on the proximal portion of the brake lever to move therewith.

16. The bar end electric shifter according to claim 15, further comprising
an electric switch configured to be activated by movement of the shift operating member with respect to the brake lever.

17. The bar end electric shifter according to claim 15, wherein
the shift operating member is located on a laterally inner side of the brake lever with respect to a center plane of a bicycle when the bar end electric shifter is attached to the handlebar of the bicycle.

18. The bar end electric shifter according to claim 15, wherein
the shift operating member is at least partially disposed above a plane containing the brake pivot axis and extending parallel to a center longitudinal axis of the free end of the handlebar when the bar end electric shifter is attached to the handlebar of the bicycle.

19. The bar end electric shifter according to claim 15, further comprising
an additional shift operating member disposed on the brake lever.

20. The bar end electric shifter according to claim 15, wherein
the brake lever has a housing enclosing the electric switch.

* * * * *